(12) United States Patent
Dole

(10) Patent No.: US 8,726,473 B2
(45) Date of Patent: May 20, 2014

(54) CLIPPING FIXATION DEVICE ALLOWING AN ADJUSTMENT IN TWO DIRECTIONS

(75) Inventor: Thierry Dole, Saint Germain-La Poterie (FR)

(73) Assignee: Faurecia Interieur Industrie, Nanterre (FR)

( * ) Notice: Subject to any disclaimer, the term of this patent is extended or adjusted under 35 U.S.C. 154(b) by 128 days.

(21) Appl. No.: 13/346,726

(22) Filed: Jan. 9, 2012

(65) Prior Publication Data

US 2013/0174389 A1 Jul. 11, 2013

(51) Int. Cl.
  *F16B 2/20* (2006.01)
  *B60R 13/02* (2006.01)
  *F16B 5/06* (2006.01)
  *F16B 21/07* (2006.01)

(52) U.S. Cl.
  CPC ............ *B60R 13/0206* (2013.01); *F16B 5/065* (2013.01); *F16B 5/0664* (2013.01); *F16B 21/071* (2013.01); *Y10S 292/38* (2013.01)
  USPC ......... 24/458; 24/297; 292/DIG. 38; 403/397

(58) Field of Classification Search
  CPC ........ F16B 21/075; F16B 21/06; F16B 21/07; F16B 5/065; F16B 5/0664; F16B 2/20; F16B 21/071; Y10S 411/913; Y10S 292/38; B60R 13/0206
  USPC .................... 24/297, 289, 662; 403/326, 397; 52/716.6, 718.02, 718.05; 296/1.08, 296/39.1, 146.7, 214, 70–72
  See application file for complete search history.

(56) References Cited

U.S. PATENT DOCUMENTS

| | | | | |
|---|---|---|---|---|
| 2,943,373 A | * | 7/1960 | Rapata | 24/662 |
| 3,038,747 A | * | 6/1962 | Rapata | 292/17 |
| 4,022,504 A | * | 5/1977 | Anderson | 292/340 |
| 5,193,961 A | * | 3/1993 | Hoyle et al. | 411/553 |
| 5,222,852 A | * | 6/1993 | Snyder | 411/553 |
| 5,437,516 A | * | 8/1995 | Sauerwein et al. | 404/2 |
| 6,289,560 B1 | * | 9/2001 | Guyot | 24/297 |
| 7,318,260 B2 | * | 1/2008 | Pearce | 24/681 |
| 8,585,121 B2 | * | 11/2013 | Marx et al. | 296/146.7 |

* cited by examiner

*Primary Examiner* — Robert J Sandy
*Assistant Examiner* — Michael Lee
(74) *Attorney, Agent, or Firm* — Reising Ethington P.C.

(57) ABSTRACT

A clipping fixation device for assembling two elements such as automotive panels or other components in a manner that provides a secure connection of the elements in an assembly direction while permitting relative longitudinal and transverse positioning of the two elements in directions orthogonal to the assembly direction. The clipping fixation device may include a first clip member and a second clip member, wherein the first clip member has a pin extending to a head and the second clip member includes two clipping arms defining a receiving space into which the first clip member can be inserted under force. The first and second clip members are dimensioned such that the pin may slide along the receiving space in the transversal direction and move in the longitudinal direction by flexing of at least one of the clipping arms without disengagement of the head from the clipping arms.

11 Claims, 2 Drawing Sheets

CLIPPING FIXATION DEVICE ALLOWING AN ADJUSTMENT IN TWO DIRECTIONS

TECHNICAL FIELD

The present invention relates generally to a clipping fixation device such as is used for attaching vehicle components together and, more particularly, for such a fixation device that permits at least some relative positioning of the two components.

BACKGROUND

Various means are known to attach two elements together, such as trim elements of a vehicle or two components of a functional part of a vehicle, including for example screws and bolts, metallic or plastic clips, etc. Such means may provide a strong and robust fixation between the elements to be assembled together. Such means are effective when the elements are to be immobilized one relative to the other.

However, in some cases, there is a need for one element to be able to move relative to the other, while being attached to it, for example for isostatic requirements between various elements of the assembly. To allow a displacement of one element relative to the other, clips are known, which offer one degree of freedom. Such clips comprise for example a pin, attached to one of the elements, introduced in a slot provided in the other element, the pin being able to slide in the slot according to one direction and being fixed relative to the element comprising the slot in the other directions.

However, one degree of freedom is not sufficient for some applications, where the elements have to be able to move according to two different directions. Known attachment means are not adapted to provide two degrees of freedom between the elements while offering a strong fixation of the elements together.

SUMMARY

One object of the invention is to remedy this drawback by providing a clipping fixation device enabling a strong fixation between two elements, in particular according to an assembly direction, while allowing the two elements to move relative to each other in more than one direction.

To this end, in accordance with one embodiment, there is provided a clipping fixation device of the type having (a) a first element comprising at least a first clip member protruding from a base of said first element, said first clip member comprising a pin provided at its end with a head, and (b) a second element comprising at least a second clip member complementary of said first clip member, said second clip member comprising two clipping arms protruding towards each other according to a longitudinal direction and defining a receiving space for the pin of the first clip member, said first clip member being engaged in said space according to an assembly direction. When the first clip member cooperates with the second clip member, the pin is maintained between the clipping arms and the head protrudes over the clipping arms. The pin is flexible relative to the base of the first element according to the longitudinal direction and the clipping arms are flexible relative to the second element according to the longitudinal direction, such that the position of the first element can be adjusted relative to the second element according the longitudinal direction. The pin and the head have a length, according to a transversal direction perpendicular to the longitudinal and to the assembly directions, greater in length of the clipping arms according to the transversal direction such that the first clip member can slide in the transversal direction in the second clip member while the pin and the head remain maintained by the clipping arms, such that the position of the first element can be adjusted relative to the second element according the transversal direction.

The clipping fixation device enables assembly of two elements together according to the longitudinal, transversal and assembly directions, such that these elements are firmly attached together along these directions, while allowing a displacement of the elements relative to each other according to at least the longitudinal and transversal directions. The clipping fixation device is particularly advantageous for attaching two elements having to respect isostatic requirements, i.e. the relative positions of which can be slightly adapted to the environment of these two elements.

Embodiments of the clipping fixation device may include one or more of the following other features: (1) The head forms at least one lip with the pin at the connection between the pin and the head, said lip forming an angle with the assembly direction, said lip resting on the clipping arms when the first clip member cooperates with the second clip member. (2) Each clipping arm of the second clip member comprises an abutment surface formed at the end of each clipping arm, the lip of the first clip member resting against said abutment surface and being able to slide on said abutment surface according to the transversal direction when the first clip member cooperates with the second clip member. (3) The clipping arms of the second clip member are spaced from each other in order to define the receiving space. (4) The space has a width less than or equal to the thickness of the pin of the first clip member. (5) The space has a width greater than or equal to the thickness of the pin of the first clip member. (6) The clipping arms of the second clip member are elastic arms in order to be flexible according to the longitudinal direction and to allow the arms to be spaced from one another to allow the head to engage in the receiving space and such that the arms return to their initial position when the first clip member cooperates with the second clip member. (7) The thickness of the clipping arms is less than the thickness of the second element. (8) The first element and/or the second element comprise at least one spacing rib extending in the assembly direction, said rib extending between the first and the second elements when the first clip member is engaged in the second clip member and being arranged to hold the first element relative to the second element according to the assembly direction.

In accordance with another embodiment, there is provided an assembly of two elements for a vehicle, attached together by a clipping fixation device as described above, one of the elements being made integral with the first clip member and the other element being made integral with the second clip member. According to another embodiment of the assembly, the elements are further attached by at least one other fixation device, said other fixation device being arranged to maintain the position of the first element relative to the second element at the other fixation device in the longitudinal, transversal, and assembly directions.

BRIEF DESCRIPTION OF THE DRAWINGS

Other aspects and advantages of the invention will appear upon reading the following description, given by example and made in reference to the appended drawings, wherein.

DETAILED DESCRIPTION OF THE ILLUSTRATED EMBODIMENT(S)

In reference to the appended drawings, a clipping fixation device 1 is described comprising a first element 2 and a second element 4, the clipping fixation device allowing the first and second elements 2 and 4 to be attached together. The elements are for example a trim panel attached to an instrument panel of an automotive vehicle or to another element of the vehicle. While the description is made in references to elements of a vehicle attached together, it is to be understood that the invention can also be applied to other elements, including outside the automotive industry.

The first and second elements 2 and 4 extend mainly in planes defined by a longitudinal direction X and a transversal direction Y, perpendicular to the longitudinal direction, and are assembled together according to an assembly direction Z perpendicular to the longitudinal and the transversal directions, i.e. by pressing the first and second elements together according to the assembly direction Z. It is to be understood that the first and second elements 2 and 4 can also have areas extending in the assembly direction Z.

Figure 1:
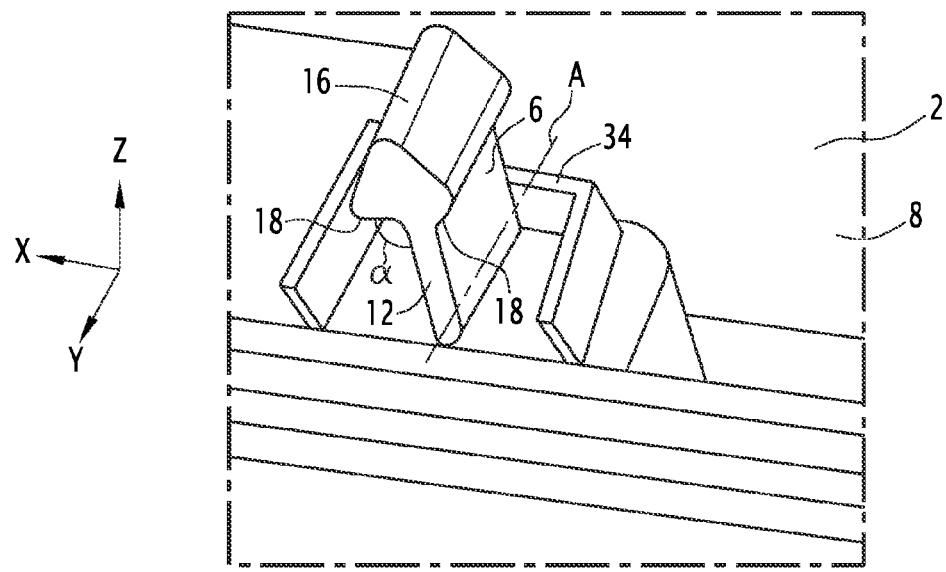
FIG. 1 is a perspective view of part of a first element having a first clip member that comprises a first portion of a clipping fixation device constructed in accordance with the invention.

The clipping fixation device 1 comprises a first clipping organ, or clip member, 6 protruding from a base 8 of the first element 2, turned towards the second element 4, and a second clipping organ, or clip member, 10 formed in the second element 4. The second clip member 10 is complementary of the first clip member 6 such that when the first clip member 6 cooperates with the second clip member 10, the attachment of the first element 2 to the second element 4 is ensured, as shown in FIGS. 3 and 4. The first clip member 6 is for example made integral with the first element 2 and the second clip member 10 is for example made integral with the second element 4, i.e. the first and second clip members are for example made in a single piece respectively with the first and the second elements, as shown in FIGS. 1 and 2.

The first clip member 6 comprises a pin 12 extending from the first element 2 according to the assembly direction Z. The pin 12 protrudes, according the assembly direction Z, from the base 8 of the first element 2. The pin 12 comprises at its free end, a head 16 intended to cooperate with the second clip member 10 as will be described below. The head 16 has for example an ovoid shape and defines with the pin 12 two lips 18 each protruding from one of the faces of the pin 12. The lips 18 form an angle α with the pin 12, i.e. each lip are inclined relative to the assembly direction Z. According to an embodiment, the angle α is comprised between 90° and 130°. This angle can be adjusted whether a firm attachment or a removable attachment is needed between the first and second elements. By firm attachment, it is meant an attachment which cannot be undone without damaging the fixation device by pulling the elements apart from each other and where a tool is for example needed to separate the elements. By removable attachment, it is meant an attachment which can be undone without substantial damage to the fixation device by pulling the elements apart from each other with a predetermined force.

The pin 12 is flexible relative to the base 8 according to the longitudinal direction X. To this end, the pin 12 is made of a material and has a thickness arranged such that the pin 12 forms an elastic tab. The elasticity of the pin 12 makes it able to slightly rotate around an axis A extending in the vicinity of the base 8 and extending in the transversal direction Y, as shown in FIG. 1.

Figure 2:
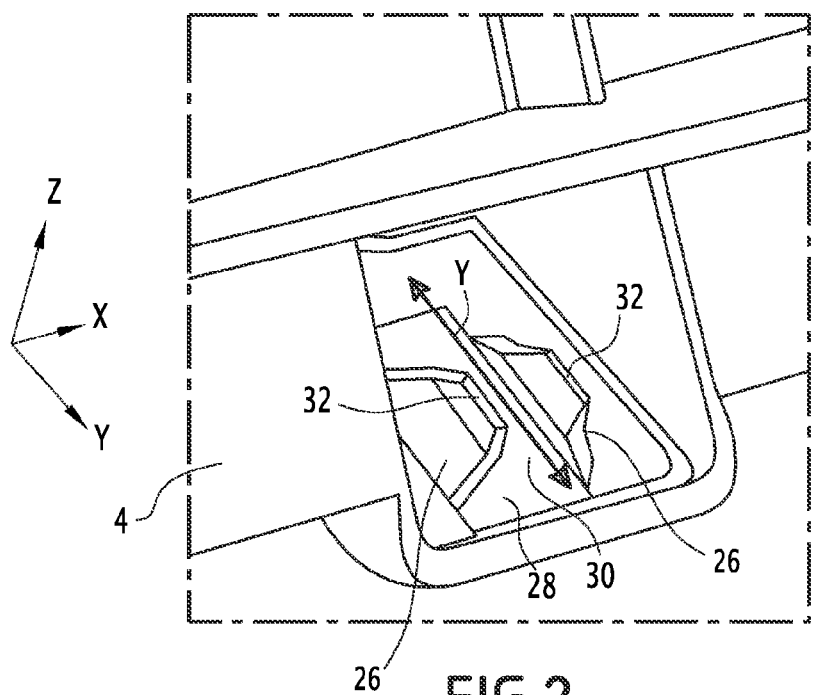
FIG. 2 is a perspective view of part of a second element having a second clip member that comprises a second portion of the clipping fixation device.
Figure 3:
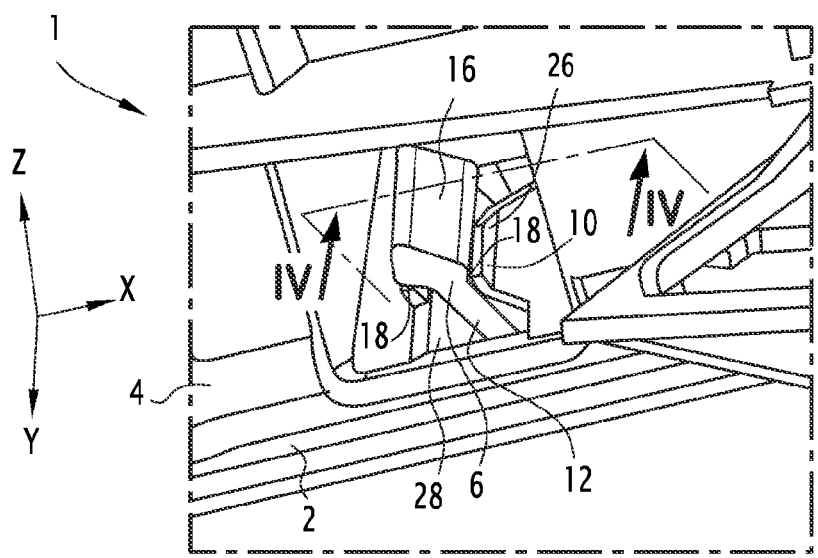
FIG. 3 is a perspective view the first element of FIG. 1 and of the second element of FIG. 2 attached together by the clipping fixation device.
Figure 4:
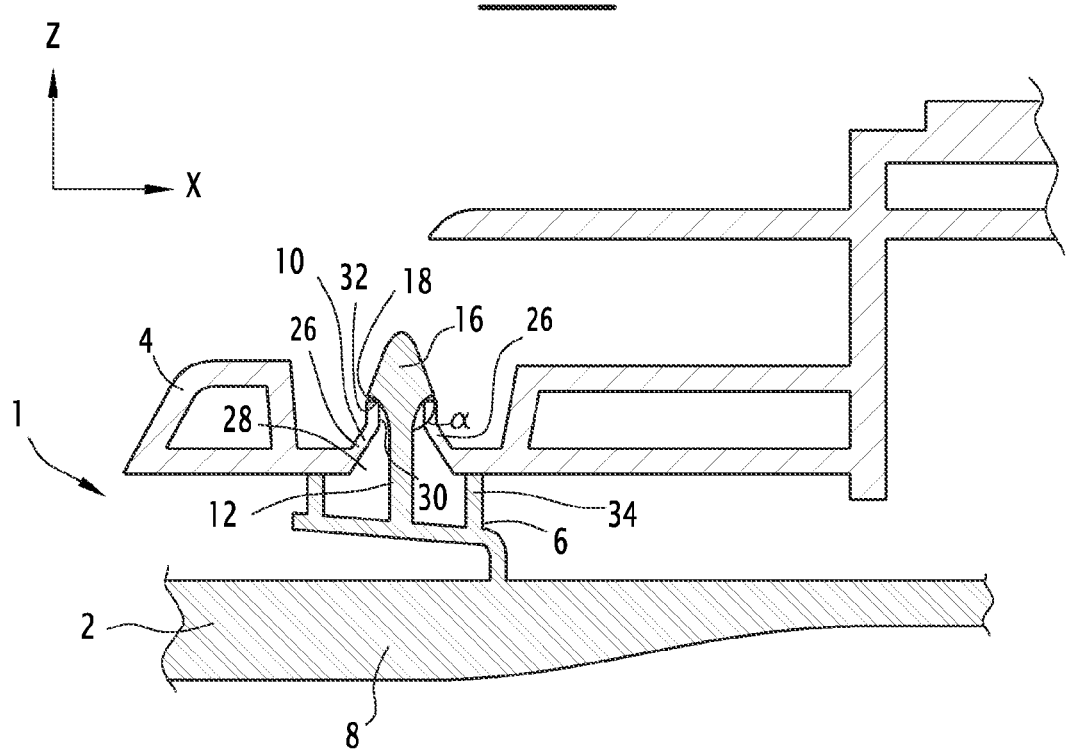
FIG. 4 is a section view taken along the IV-IV direction of FIG. 3.

The second clip member 10 comprises two clipping arms 26 protruding from the second element 4 on the face of the second element 4 opposite the face facing the first element 2, as shown in FIGS. 2 to 4. The clipping arms 26 extend on either sides of an aperture 28 formed in the second element 4 and are arranged such that they protrudes towards each other over the aperture 28 according to the longitudinal direction X as shown in FIGS. 2 and 4. The clipping arms 26 are thus inclined relative to the second element 4 and to the pin 12 of the first clip member 6. In addition, the clipping arms 26 are separated from one another, i.e. they are not joined to each other in the transversal or longitudinal directions. More particularly, they are not joined to each other at their transversal ends, meaning that one clipping arm 26 can move independently from the other. At their free ends extending over the aperture 28, the clipping arms 26 are spaced from each other such as to define a receiving space 30 of the head 16 and of the pin 12 between the clipping arms 26. The width of the receiving space 30 is substantially equal to or slightly less than the thickness of the pin 12 when a firm attachment is needed or equal to or slightly greater than the thickness of the pin 12 when a removable attachment is needed.

The clipping arms 26 each comprise at their free end an abutment surface 32 against which the lips 18, formed between the head 16 and the pin 12 of the first clip member, rest when the first clip member 6 is engaged in the second clip member 10, as shown in FIG. 4, thereby maintaining the first clip member 6 in the second clip member 10 according to the assembly direction Z. The abutment surfaces 32 extend substantially parallel to the corresponding lips 18, i.e. they form an angle α with the assembly direction Z. The length of the clipping arms 26 at their free end in the transversal direction is equal to or less than the length of the clipping arms 26 at their opposite end; i.e. where they are joined to the second element 4, so as to define clipping arms 26 having an overall trapezoidal shape as shown in FIG. 2 or having an overall rectangular shape if the length of the free ends and opposite ends are equal to each other.

The clipping arms 26 are flexible according to the longitudinal direction X, i.e. they are elastically deformable according to longitudinal direction. To render the clipping arms 26 flexible, they have a thickness which is less than the thickness of the rest of the second element 2; as shown in FIG. 4.

This elasticity serves several purposes. When the head comes into contact with the clipping arms 26, they are able to be spaced from each other, thereby allowing the engagement of the first clip member in the second clip member according to the assembly direction Z. Once the head 16 has passed the clipping arms 26 and the part of the pin 12 below the head is engaged in the receiving space 30, they are able to come back in their initial position.

In case of a firm attachment, when the receiving space 30 is substantially equal to or slightly less than the thickness of the pin 12, the clipping arms 26 when coming back to their initial position will rest or be pressed against the pin 12 in order to maintain the first clip member 6 in the second clip member 10 according to the longitudinal direction X. In this embodiment the lips 18 rest against the abutment surfaces 32 in addition to the clipping arms 26 on the pin 12, the first clip member 6 can not be disengaged from the second clip member 10 except by separating the clipping arms 26, for example by hand or via a tool spacing the clipping arms 26 from one another.

In case of a removable attachment, when the receiving space 30 is substantially equal to or slightly greater than the thickness of the pin 12, only the abutment surfaces 32 of the clipping arms 26, when coming back to their initial position, will rest or be pressed against the lips 18 of the pin 12 in order to maintain the first clip member 6 in the second clip member 10 according to the longitudinal direction X. In this embodiment, the first clip member 6 can be disengaged from the second clip member 10 by a controlled force in the assembly direction Z due to the elasticity of the clipping arms 26 and to the angle α formed by the lips 18 with the assembly direction Z.

Furthermore, the clipping arms are able to be deformed with the pin 12 in the longitudinal direction, which makes it possible to adjust the position of the first element 2 relative to the second element 4 according to the longitudinal direction X. Therefore, the clipping fixation device 1 offers a first degree of freedom according to the longitudinal direction.

In order to further ensure a constant contact in the assembly direction Z of the first clip member 6 to the second clip member 10, the first element 2 and/or the second element 4 comprise at least one spacing rib 34 extending in the assembly direction Z, as shown in FIGS. 1 and 4. The spacing rib 34 is arranged to extend between the first element 2 and the second element 4 when the first clip member 6 cooperates with the second clip member 10 such that the free end of the spacing rib is slightly pressed against the first element 2 and/or the second element 4, thereby preventing, in cooperation with the lips 18 and the abutment surfaces 32, a movement of the first clip member 6 relative to the second clip member 10 according to the assembly direction Z, improving as a consequence the overall performances of the clipping device by reducing the risk of squeak and rattle. In the embodiment shown in the figures, the spacing rib 34 protrudes from the base 8 of the first element 2 and partly surrounds the pin 12 at a distance thereof.

In the transversal direction Y, perpendicular to the longitudinal and to the assembly directions X and Z, the aperture 28 has a length greater than the length of the pin 12, such that the pin 12 can move inside the aperture 28 and slide between the clipping arms 26 in the transversal direction Y, as shown by the arrow of FIG. 2.

Furthermore, the pin 12 and the head 16 have a length in the transversal direction Y greater than the length of the clipping arms 26 in the transversal direction Y. Therefore, the length of the lips 18 of the first clip member 6 is greater than the length of the abutment surfaces 32 on which the lips are able to slide in the transversal direction Y. Consequently, when the first clip member 6 is moved in the transversal direction Y relative to the second clip member 10, the lips 18 always remain on the abutment surfaces 32 and the first clip member 6 is not disengaged from the second clip member 10. The clipping fixation device 1 therefore offers a second degree of freedom in the transversal direction Y.

When the first element 2 is attached to the second element 4, the pin 12 of the first clip member 6 is placed opposite the aperture 28 and the first element 2 is moved towards the second element 4 according to the assembly direction Z. The head 16 of the first clip member 6 then comes into contact with the clipping arms 26 and pushes them apart until the head 16 extends above the clipping arms 26. The arms 26 then come back into their initial position where they are placed against the pin 12 and the lips 18 cooperate with the abutment surfaces 32 of the clipping arms 26. The first clip member 6 cooperates with the second clip member 10 and is locked relative to the second clip member 10 according to the longitudinal direction X and to the assembly direction Z as explained above. The pin 12 is however able to move relative to the second clip member 10 according to the transversal direction Y, meaning that the position of the first element 2 can be adjusted relative to the second element 4 in the transversal direction Y.

The first clip member 6 is immobilized relative to the second clip member 10 in the longitudinal direction, but the first clip member 6 and the second clip member 10 can move together relative to the base 8 of the first element 2 and to the second element 4, thanks to the flexibility in the longitudinal direction X of the pin 12 and of the clipping arms 26, meaning that the position of the first element 2 can also be adjusted relative to the second element 4 in the longitudinal direction X.

Therefore, the above-described clipping fixation device 1 allows a firm attachment of the first element 2 to the second element 4 in all directions while allowing an adjustment of the position of the first element 2 relative to the second element 4 in the longitudinal direction X and in the transversal direction Y.

Since, the first clip member 6 is made integral with the first element 2, for example in plastics material and the second clip member 10 is made integral with the second element 4, for example in plastics material, the clipping fixation device 1 is easy and inexpensive to produce.

It is to be understood that several clipping fixation devices 1 can be provided in the first and second elements to properly attach them together.

More particularly, the first and second elements 2 and 4 can be attached with clipping fixation devices 1 as described above, enabling to locally adjust the position of the first element 2 relative to the second element 4 in the longitudinal and transversal directions, and with regular fixation devices, offering no degree of freedom, to locally maintain the position of the first element relative to the second element in the longitudinal, traverse, and assembly directions. It is then possible to precisely adapt the position of the first element relative to the second element and respect isostatic requirements and as a consequence improve the aesthetic aspect of the complete assembly by precisely adapt the gap between two adjacent elements.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. Clipping fixation device, comprising:
a first element comprising at least a first clip member protruding from a base of said first element, said first clip member comprising a pin provided at its end with a head;
a second element comprising at least a second clip member complementary of said first clip member, said second clip member comprising two clipping arms protruding towards each other according to a longitudinal direction and defining a receiving space for the pin of the first clip member, said first clip member being engaged in said space according to an assembly direction;
wherein, when the first clip member cooperates with the second clip member, the pin is maintained between the clipping arms and the head protrudes over the clipping arms;
wherein the pin is flexible relative to the base of the first element according to the longitudinal direction and the clipping arms are flexible relative to the second element according to the longitudinal direction, such that the position of the first element can be adjusted relative to the second element according the longitudinal direction;
wherein, the pin and the head have a length, according to a transversal direction perpendicular to the longitudinal and to the assembly directions, greater than the length of the clipping arms according to the transversal direction such that the first clip member can slide in the transversal direction in the second clip member while the pin and the head remain maintained by the clipping arms, such that the position of the first element can be adjusted relative to the second element according the transversal direction.

2. Clipping fixation device according to claim 1, wherein the head forms at least one lip with the pin at the connection between the pin and the head, said lip forming an angle with the assembly direction, said lip resting on the clipping arms when the first clip member cooperates with the second clip member.

3. Clipping fixation device according to claim 2, wherein each clipping arm of the second clip member comprises an abutment surface formed at the end of each clipping arm, the lip of the first clip member resting against said abutment surface and being able to slide on said abutment surface according to the transversal direction when the first clip member cooperates with the second clip member.

4. Clipping fixation device according to claim 1, wherein the clipping arms of the second clip member are spaced from each other in order to define the receiving space.

5. Clipping fixation device according to claim 1, wherein the space has a width less than or equal to the thickness of the pin of the first clip member.

6. Clipping fixation device according to claim 1, wherein the space has a width greater than or equal to the thickness of the pin of the first clip member.

7. Clipping fixation device according to claim 1, wherein the clipping arms of the second clip member are elastic arms in order to be flexible according to the longitudinal direction and to allow the arms to be spaced from one another to allow the head to engage in the receiving space and such that the arms return to their initial position when the first clip member cooperates with the second clip member.

8. Clipping fixation device according to claim 7, wherein the thickness of the clipping arms is less than the thickness of the second element.

9. Clipping fixation device according to claim 1, wherein at least one of first and second elements comprises at least one spacing rib extending in the assembly direction, said rib extending between the first and the second elements when the first clip member is engaged in the second clip member and being arranged to hold the first element relative to the second element according to the assembly direction.

10. A vehicle assembly, comprising at least one clipping fixation device according to claim 1, wherein the first element is integral with the first clip member, the second element is integral with the second clip member, and the first and second elements are attached to each other by the first and second clip members.

11. A vehicle assembly according to claim 10, wherein the first and second elements are further attached by at least one other fixation device, said other fixation device being arranged to maintain the position of the first element relative to the second element in all directions.

* * * * *